Patented July 23, 1929.

1,721,867

UNITED STATES PATENT OFFICE.

NINNI MARIA KRONBERG, OF RYDSGARD, SWEDEN.

METHOD OF PRODUCING A PULVERIZED-MILK SERUM PRODUCT.

No Drawing. Application filed November 23, 1928, Serial No. 321,501, and in Sweden September 16, 1927.

The present invention relates to an improved process for producing a milk serum preparation.

One of the objects of the invention is to provide a powdered milk product that possesses an exceedingly high fermentation capacity and an unusual durability at low temperatures.

A further object consists in a powdered milk product capable of keeping for an indefinite period without losing any of its desirable properties and may be conveniently packed for marketing, and which will effect a material saving in the quantity of milk and yeast required in the baking of bread, biscuits, cakes and the like. Additionally, the product when mixed with the dough will provide a more even and regular pore formation and a small quantity of the product will be sufficient to materially increase the quality and nutritive values of the ingredients with which it is mixed.

In the baking of bread, cakes, biscuits and the like, a number of methods have heretofore been employed to increase the quality both as to fineness and lightness of the baked material. Thus it is well-known to mix with sour milk a cheese-like preparation such as yogurt milk so as to check the development of harmful micro-organisms and the dough so formed then baked in the usual manner. In another method, skimmed milk has been used in the preparation of the dough and before the milk was mixed with the flour or yeast, Caucasion keeve or kefir milk and sour dough have been added to the milk so as to produce fermentation.

The present invention provides a method of producing a powdered milk serum which when mixed with the dough not only gives a desirable lightness and fine texture to the baked material, but also produces a very palatable and nutritious baked product.

In carrying out my process, the milk is not only skimmed and pasteurized so as to remove all pathogenic and putrefactive germs but it is additionally heated to a temperature of between 115 and 120° C. in an autoclave or other suitable vessel to insure the destruction of all living germs. The milk thus treated is then cooled down to around 30° or 40° C. and is inoculated with pure cultures of certain lactococci and certain lacto-bacilli such as *Bacillus guntheri* and *Bacillus casei*. The inoculated milk is then allowed to stand for about twelve hours at this cooled temperature (30° or 40° C.). Subsequently are added nutritious and saccharine matter such as milk sugar of the chemical composition

and

To this inoculated and fully prepared milk is mixed a vegetable fat such as coconut fat and a substance which is rich in diastase, and the resultant mass or product is allowed to reach a maximum degree of acidity of about 1 per cent. The product thus obtained is then desiccated at a temperature between 36° and 40° C. and is then ground to powdered form, and is ready for use. When this powdered milk serum is mixed with dough in the baking of bread, cakes, biscuits and the like, the mixture forms a dough which can be easily handled, and the baked product has very light and fine texture.

The drying of the serum is effected in a drying chamber and takes about three or four days. The normal degree of acidity in the dried product is substantially 0.5 per cent. The product will keep practically indefinitely and can be used after being stored for months and even as long as a year or more without losing any of its strength or other desirable characteristics.

One method of producing the powdered milk serum is as follows:

Sixty litres of skimmed milk is treated in an autoclave at a temperature of between 115 and 120° C. and allowed to cool down to a temperature of between 30° and 40° C. This milk is then inoculated with pure lactic acid cultures such as *Bact. guntheri* and *Bact. casei*, and subsequently is mixed with sulphate of ammonia, having the chemical formula $(NH_4)2SO_4$, and a saccharine matter, such as milk sugar. The mixture is allowed to stand at this temperature (30-40° C.) for about twelve hours and then has added to it four or five kilogrammes of a vegetable fat such as high grade coconut fat and fifteen kilogrammes of a substance rich in diastase, such as *Triticum amylaceum*. The product thus formed is left at a temperature of about 20° to 25° C. until it has developed a degree of acidity not more than 1 per cent. It is then desiccated at a temperature of between 36° or 40° C. and then reduced to pulverulent form.

The serum when used for baking may either be mixed direct with the flour or placed in the bottom of a mixing tub after which water and flour are added.

Tests have proven conclusively that this milk product possesses an exceedingly high fermentation capacity while a solution of the substance shows unusual durability at a temperature of 36° C. The acidity of the product at the beginning is about 0.5 per cent and gradually increases until after about five days it reaches around 2 per cent. A dough prepared with this milk product does not become sour even at a temperature as low as 28° C. within twelve hours. Moreover, my product effects a saving of milk and yeast of between 50 per cent and seventy-five per cent, while the yield of bread is increased by approximately 5 volume per cent. Not only is a more even and regular pore formation attained when the dough is mixed with my serum, but it is also a fact that a very small quantity of the serum is required in order to impart the desired qualities to the baked material. Under ordinary circumstances about 2 weight per cent of the serum has been found sufficient.

It is to be understood that the form of the invention herewith described is merely illustrative of preferred embodiment and that such changes in the steps of my process which fall within the purview of one skilled in the art may be made without departing from the spirit of the invention and the scope of the appended claims.

What I claim is:

1. A process for preparing a powdered milk serum which consists in introducing skimmed milk into an autoclave and heating the same, allowing the milk to cool, inoculating the cooled milk with pure lactic cultures, adding salts and saccharine matter, allowing the mixture to stand for a time, then adding a vegetable fat and a substance rich in diastase, desiccating the compound at a cool temperature, and finally reducing the compound to a pulverized form.

2. A process for preparing a powdered milk serum which consists in introducing skimmed milk into an autoclave and subjecting it to a temperature in excess of 100° C. to destroy all living germs, allowing the milk thus treated to cool down to a temperature below 45° C., inoculating the cooled milk with pure lactic cultures, then adding sulphate of ammonia and saccharine matter, allowing the mixture to stand for about twelve hours, then adding about four kilogrammes of vegetable fat, and a substance rich in diastase, so as to form a compound which is allowed to stand at a temperature of between 25 and 30° C. until the acidity has reached the maximum of 1 per cent, desiccating the compound at a temperature of between 36 and 40° C., and finally reducing the compound to a powdered form.

3. A process for preparing a powdered milk serum which consists in introducing skimmed milk into an autoclave and subjecting it to a temperature in excess of 100° C., to destroy all living germs, allowing the milk thus treated to cool down to a temperature below 45° C., inoculating the cooled milk with *Bact. guntheri* and *Bact. casei*, then adding sulphate of ammonia and saccharine matter, allowing the mixture to stand for about twelve hours, then adding about four kilogrammes of coconut fat and *Triticum amylaceum* so as to form a compound which is allowed to stand at a temperature of between 25 and 30° C. until the acidity has reached the maximum of 1 per cent, desiccating the compound at a temperature of between 36 and 40° C., and finally reducing the compound to a powdered form.

4. A method of producing a milk serum preparation for the improvement of bread, cakes, biscuits and the like and as an aid in the baking thereof, which consists in heating skimmed milk in an autoclave to a temperature of between 115° and 120° C. so as to destroy all living germs therein, allowing the milk to cool down to a temperature between 30° and 40° C., inoculating the milk with pure lactic acid cultures, adding salts such as sulphate of ammonia $(NH_4)2SO_4$, and saccharine matter such as milk sugar, allowing the mixture to stand at a temperature between 30° and 40° C. for about twelve hours, then adding a vegetable fat such as coconut fat and a substance rich in diastase such as *Triticum amylaceum*, allowing the compound to stand at a temperature between 25° and 30° C. until the acidity reaches a maximum of about 1 per cent, then desiccating the compound at a temperature of between 36° and 40° C., and finally reducing the compound to a pulverized form.

In testimony whereof I have hereunto set my hand.

NINNI M. KRONBERG.